(12) United States Patent
Bekele et al.

(10) Patent No.: US 8,139,606 B2
(45) Date of Patent: Mar. 20, 2012

(54) METHODS AND SYSTEMS FOR PROVIDING SWITCHED BROADBAND

(75) Inventors: Ben G. Bekele, Cumming, GA (US); John J. Coppola, Cumming, GA (US)

(73) Assignee: Cox Communications, Inc., Atlanta, GA (US)

( * ) Notice: Subject to any disclaimer, the term of this patent is extended or adjusted under 35 U.S.C. 154(b) by 1267 days.

(21) Appl. No.: 11/257,862

(22) Filed: Oct. 25, 2005

(65) Prior Publication Data

US 2007/0030860 A1    Feb. 8, 2007

Related U.S. Application Data

(60) Provisional application No. 60/704,827, filed on Aug. 2, 2005.

(51) Int. Cl.
*H04J 3/16* (2006.01)
*G01R 31/08* (2006.01)

(52) U.S. Cl. ........ 370/468; 370/229; 370/389; 370/235; 370/395.41; 709/235; 709/231

(58) Field of Classification Search .................. 370/468, 370/229, 389, 235, 395.21, 395.3, 395.4, 370/395.41; 705/1, 40; 463/42; 709/235, 709/231, 232, 233

See application file for complete search history.

(56) References Cited

U.S. PATENT DOCUMENTS

| | | | |
|---|---|---|---|
| 6,363,429 B1* | 3/2002 | Ketcham | 709/235 |
| 7,085,232 B1* | 8/2006 | Raissinia et al. | 370/235 |
| 7,324,551 B1* | 1/2008 | Stammers | 370/468 |
| 2002/0036984 A1* | 3/2002 | Chiussi et al. | 370/232 |
| 2004/0063497 A1* | 4/2004 | Gould | 463/42 |
| 2005/0052992 A1* | 3/2005 | Cloonan et al. | 370/229 |
| 2005/0055220 A1* | 3/2005 | Lee et al. | 705/1 |
| 2005/0265398 A1* | 12/2005 | Chapman et al. | 370/509 |
| 2006/0040742 A1* | 2/2006 | Wright et al. | 463/42 |
| 2006/0215650 A1* | 9/2006 | Wollmershauser et al. | 370/389 |

* cited by examiner

*Primary Examiner* — Aung S Moe
*Assistant Examiner* — Jamal Javaid
(74) *Attorney, Agent, or Firm* — Merchant & Gould

(57) ABSTRACT

Systems and methods are disclosed for providing switched broadband. The disclosed systems and methods may include creating a traffic signature corresponding to a network element connected to a network, the network element having a network element ID and being addressable on the network by the network element ID. Furthermore, the disclosed systems and methods may include optimizing a quality of service for the network element based on the created traffic signature.

17 Claims, 4 Drawing Sheets

METHODS AND SYSTEMS FOR PROVIDING SWITCHED BROADBAND

RELATED APPLICATION

Under provisions of 35 U.S.C. §119(e), the Applicants claim the benefit of U.S. provisional application No. 60/704,827, entitled METHODS AND SYSTEMS FOR PROVIDING SWITCHED BROADBAND, filed Aug. 2, 2005, which is incorporated herein by reference.

BACKGROUND OF THE INVENTION

I. Field of the Invention

The present invention generally relates to methods and systems for providing switched broadband. More particularly, the present invention relates to providing switched broadband to optimize quality of service and actively manage bandwidth on a per network element basis.

II. Background Information

Service providers have provided "best effort" data services using a simple over-subscription model. The addition of value-added services, and that subscribers within a given location could have multiple services per single network element ID (as well as multiple network elements that subscribe to multiple services), the simple over-subscription model becomes obsolete. The emergence of voice-over-internet protocol (VOIP), committed information rate (CIR) based services, and multimedia services makes the effective real time management of a network resource a vital component for broadband service delivery. Thus, the conventional strategy is for broadband system operators to use cable modem termination systems (CMTS) to switches (or routers) to provide best-effort Internet access. This often causes problems because when system operators want to offer value-added, tiered services, or make different services available to multiple sets of customers (even different sets of services for multiple devices within a single subscriber's home,) the situation becomes much more complex.

In view of the foregoing, there is a need for methods and systems for providing switched broadband more optimally. Furthermore, there is a need for providing switched broadband to optimize quality of service on a per network element basis.

SUMMARY OF THE INVENTION

Consistent with embodiments of the present invention, systems and methods are disclosed for providing switched broadband.

In accordance with one embodiment, a method for providing switched broadband comprises creating a traffic signature corresponding to a network element connected to a network, the network element having a network element ID and being addressable on the network by the network element ID and optimizing a quality of service for the network element based on the created traffic signature.

According to another embodiment, a system for providing switched broadband comprises a memory storage for maintaining a database and a processing unit coupled to the memory storage, wherein the processing unit is operative to create a traffic signature corresponding to a network element connected to a network, the network element having a network element ID and being addressable on the network by the network element ID and optimize a quality of service for the network element based on the created traffic signature.

In accordance with yet another embodiment, a computer-readable medium which stores a set of instructions which when executed performs a method for providing switched broadband, the method executed by the set of instructions comprising creating a traffic signature corresponding to a network element connected to a network, the network element having a network element ID and being addressable on the network by the network element ID and optimizing a quality of service for the network element based on the created traffic signature.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
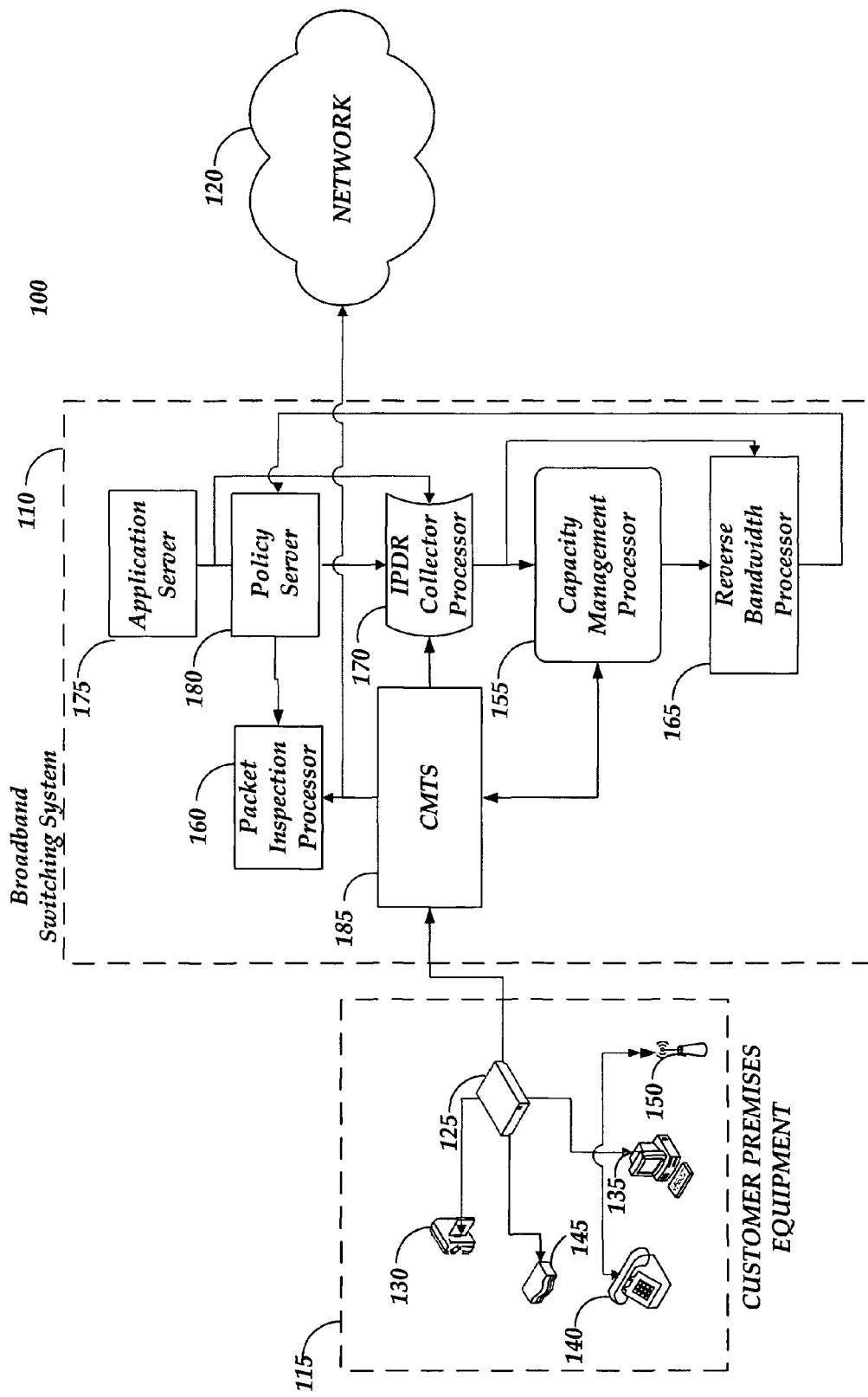
FIG. 1 is a block diagram of an exemplary switched broadband system consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding stages to the disclosed methods. Accordingly, the following detailed description does not limit the invention. Instead, the proper scope of the invention is defined by the appended claims.

Systems and methods consistent with embodiments of the present invention provide switched broadband. Consistent with an embodiment of the present invention, a switched broadband network architecture (SBNA) may define an architecture that allows the allocation of optimized quality of service (QOS) per network element ID based, for example, on traffic signature. This architecture may define a system for analyzing overall available bandwidth, traffic patterns and usage, and then dynamically optimize QOS. It may also manage network capacity by looking at the available bandwidth and signal provisioning, network management, and, when possible, dynamically reallocate bandwidth.

A switched broadband network within a data-over-cable service interface specification (DOCSIS) environment (i.e. a switched DOCSIS network), for example, may allow QOS optimization in real time and may allow efficient bandwidth management. This may improve a customer's broadband experience and efficiently use a service provider's broadband network. Conventional broadband network modeling is done through static over-subscription models. These models work well with best effort data services where subscribers get the bandwidth that is available on a first come first served basis and based, for example, on traffic priority. As broadband service moves into VOIP, multimedia, and other guaranteed services that may require low latency and jitter, there may be a need to allocate bandwidth to these services without affecting the best effort data services. One way to insure this is to look at a customer's traffic profile and dynamically allocate QOS profiles that may meet service level agreements or service performance metrics. For example, a best effort data customer that is playing a video game with streaming video over the network, may be provided two separate QOS profiles, one specifically optimized for the video game and the other optimized for the streaming video content that the customer may be downloading.

An embodiment consistent with the invention may comprise a system for providing switched broadband. The system may comprise a memory storage for maintaining a database and a processing unit coupled to the memory storage. The processing unit may be operative to create a traffic signature corresponding to a network element connected to a network, the network element having a network element ID and being addressable on the network by the network element ID and optimize a quality of service for the network element based on the created traffic signature.

Consistent with an embodiment of the present invention, the aforementioned memory, processing unit, and other components may be implemented in a switched broadband system, such as an exemplary switched broadband system 100 of FIG. 1. Any suitable combination of hardware, software, and/or firmware may be used to implement the memory, processing unit, or other components. By way of example, the memory, processing unit, or other components may be implemented with any one or more of the processors within a broadband switching system 110 (as discussed below), in combination with system 100. The aforementioned system and processors are exemplary and other systems and processors may comprise the aforementioned memory, processing unit, or other components, consistent with embodiments of the present invention.

By way of a non-limiting example, FIG. 1 illustrates system 100 in which the features and principles of the present invention may be implemented. As illustrated in the block diagram of FIG. 1, system 100 may include broadband switching system 110, customer premises equipment (CPE) 115, and a network 120. CPE 115 may include a cable modem 125 connected to a variety of end-use devices such as video device 130, game device 135, telephone 140, user computer 145, and wireless device 150.

Broadband switching system 110 may include a capacity management processor 155, a packet inspection processor 160, a reverse bandwidth processor 165, an internet protocol data record (IPDR) collector processor 170, an application server 175, a policy server 180, and a head end equipment (CMTS) 185. Network 120 may comprise, for example, a local area network (LAN) or a wide area network (WAN) including, for example, enterprise-wide computer networks, intranets, and the Internet. The aforementioned are exemplary, and network 120 may comprise other network types.

Capacity management processor 155 may utilize an algorithm that in turn may utilize a network dimensioning engine to analyze the broadband network and then make an assessment as to how the network should react. Packet inspection processor 160 may create a traffic signature comprising a profile of traffic patterns as well as packet size and protocol distribution at a network element QOS level (e.g. the service flow level in DOCSIS.) The traffic signature may contain packet size and protocol distribution at a service flow or service class name level. Capacity management processor 155 may also tweak the admission control at the head end equipment (CMTS) based, for example, on history and type of traffic in the network.

Reverse bandwidth processor 165 may analyze the traffic pattern and traffic signature. In addition, reverse bandwidth processor 165 may create an optimized QOS for an application and traffic type that a network element ID is using. Policy server 180 may receive a signal from reverse bandwidth processor 165. Then policy server 180 may signal CMTS 185 to create the optimized QOS settings derived using reverse bandwidth processor 165. Capacity management processor 155 may perform a sanity check on the feedback received from reverse bandwidth processor 165 before installing the QOS policy on CMTS 185.

IPDR collector processor 170 may be used as a repository for QOS profile stats and packet signature stats on a per network element ID basis. This data may be used to look at the current network capacity status, real time analysis of the network, and optimization of the network element QOS. CMTS 185, policy server 180, and other network elements may send their stats into IPDR collector processor 170 and that in turn is fed back into capacity management processor 155 for analysis as well as real time feedback of network conditions.

Figure 2:
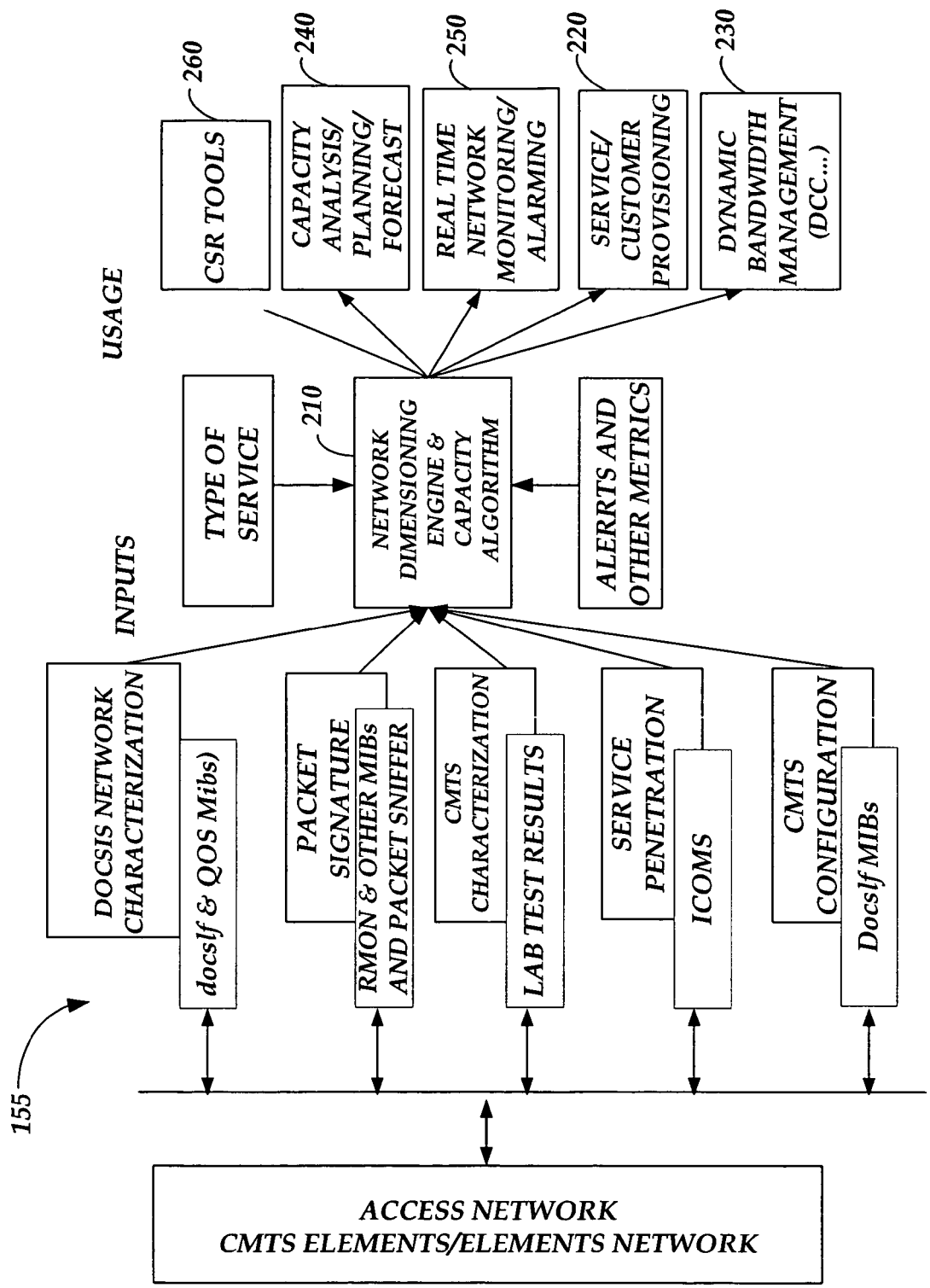
FIG. 2 is a block diagram of an exemplary capacity management processor consistent with an embodiment of the present invention.

FIG. 2 is a block diagram of capacity management processor 155 consistent with an embodiment of the present invention. As shown in FIG. 2, capacity management processor 155 may include a network dimensioning engine 210 that may use a capacity management algorithm. Network dimensioning engine 210 may provide feedback on the average upstream and downstream network utilization based on the inputs provided, for example, by the user. For example, inputs to network dimensioning engine 210 may include network conditions, network and system configurations, type of services, and traffic patterns. The capacity management algorithm may take the utilization output of network dimensioning engine 210 and provide an analysis for the purpose of customer provisioning 220, dynamic bandwidth management 230, long term capacity analysis and trending 240, real time network monitoring 250, and customer service representative tools 260.

Figure 3:
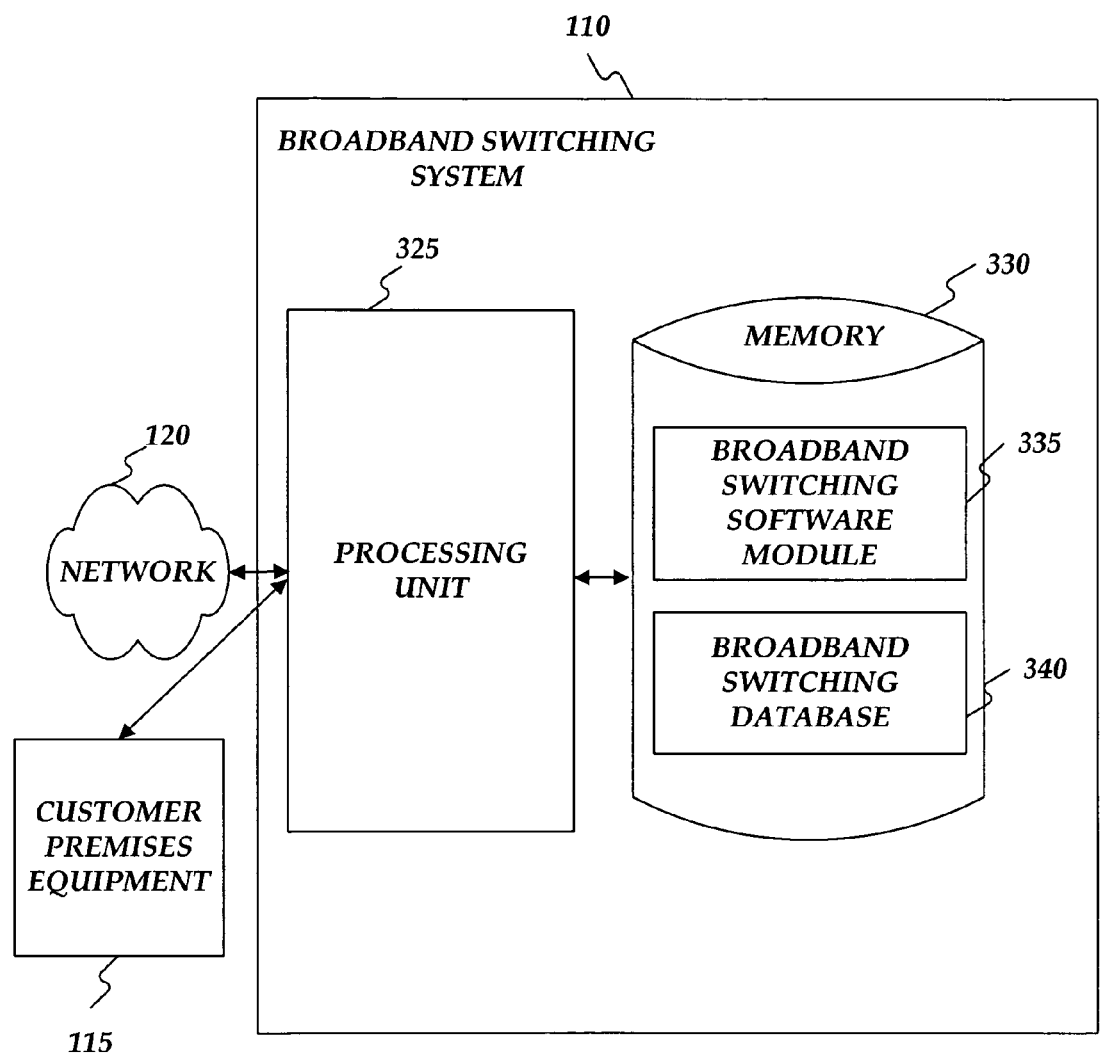
FIG. 3 is a block diagram of an exemplary broadband switching system consistent with an embodiment of the present invention.

FIG. 3 shows broadband switching system 110 of FIG. 1 in another embodiment in which system 100's functionality is performed by one processor. As shown in FIG. 3, broadband switching system 110 may include a processing unit 325 and a memory 330. Memory 330 may include a broadband switching software module 335 and a broadband switching database 340. While executing on processing unit 325, broadband switching software module 335 may perform processes for providing broadband switching, including, for example, one or more of the stages of method 400 described below with respect to FIG. 4. Furthermore, all or any portion of the functionality of software module 335 and database 340 may be executed on or reside in, for example, one or more of capacity management processor 155, packet inspection processor 160, reverse bandwidth processor 165, internet protocol data record (IPDR) collector processor 170, application server 175, policy server 180 alone or in combination with processors as shown in FIG. 1.

Broadband switching system 110, capacity management processor 155, packet inspection processor 160, reverse bandwidth processor 165, internet protocol data record (IPDR) collector processor 170, application server 175, policy server 180 ("the processors") included in system 100 may be implemented using a personal computer, network computer, mainframe, or other similar microcomputer-based workstation. The processors may though comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processors may comprise other systems or devices.

The processors may be connected using a processor network (not shown.) The processor network may comprise, for example, a local area network (LAN) or a wide area network (WAN). Such networking environments are commonplace in offices, enterprise-wide computer networks, intranets, and the Internet. When a LAN is used as the processor network, a network interface located at any of the processors may be used to interconnect any of the processors. When the processor network is implemented in a WAN networking environment, such as the Internet, the processors may typically include an internal or external modem (not shown) or other means for establishing communications over the WAN. Further, in utilizing the processor network, data sent over the processor network may be encrypted to insure data security by using known encryption/decryption techniques.

In addition to utilizing a wire line communications system as the processor network, a wireless communications system, or a combination of wire line and wireless may be utilized as the processor network in order to, for example, exchange web pages, exchange e-mails, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission. For example, the processors may communicate across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802.11), a bluetooth interface, another RF communication interface, and/or an optical interface.

System 100 may also transmit data by methods and processes other than, or in combination with, the processor network. These methods and processes may include, but are not limited to, transferring data via, diskette, flash memory sticks, CD ROM, facsimile, conventional mail, an interactive voice response system (IVR), or via voice over a publicly switched telephone network.

Figure 4:
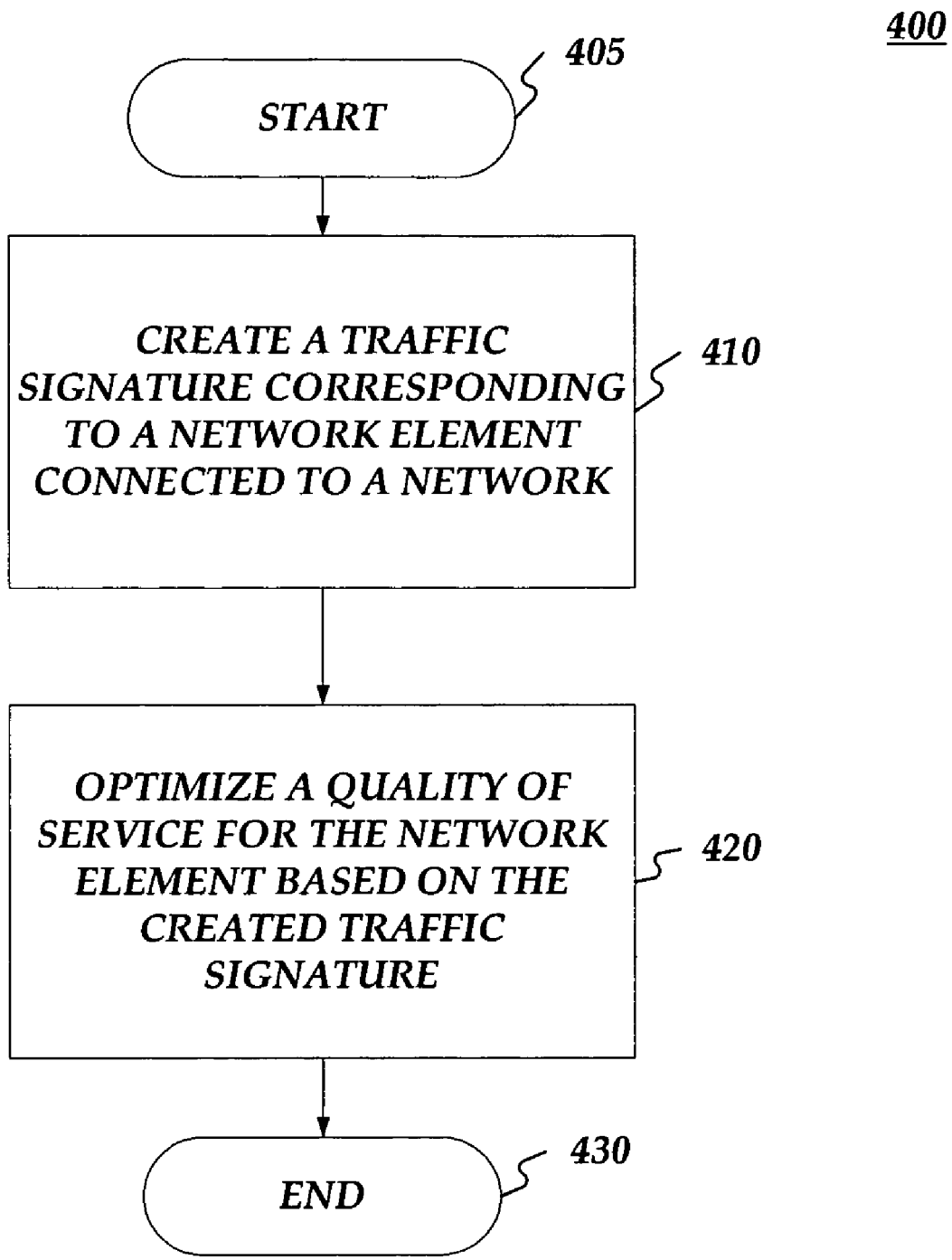
FIG. 4 is a flow chart of an exemplary method for providing switched broadband consistent with an embodiment of the present invention.

FIG. 4 is a flow chart setting forth the general stages involved in an exemplary method 400 consistent with the invention for providing switched broadband using system 100 of FIG. 1. Exemplary ways to implement the stages of exemplary method 400 will be described in greater detail below. Exemplary method 400 may begin at starting block 405 and proceed to stage 410 where broadband switching system 110 may create a traffic signature corresponding to a network element connected to network 120. The network element may have a network element ID that may be addressable on network 120 by the network element ID. The network element may comprise a cable modem, a router, a computer, a personal digital assistant, a telephone, a communications device, or any other elements capable of connecting to and communicating on a network. For example, the network element may comprise, but not limited to, any element or device within CPE 115. The aforementioned network elements are exemplary and others may be used. The network element ID may comprise a message authentication code (MAC) address, an internet protocol (IP) address, a serial number, or any other element capable of identifying a network element. The aforementioned network element IDs are exemplary and others may be used.

Consistent with an embodiment of the invention, in order to create the traffic signature corresponding to the network element, capacity management processor 155 may model network 120's capacity based on static QOS parameters as well as well known dynamic services. The dynamic services may comprise, but are not limited to, VOIP and multimedia provided to subscribers. Once capacity management processor 155 performs the modeling, an admission control policy may be established and communicated to policy server 180 and CMTS 185. The admission control policy may establish how many subscribers of each service could be provisioned on each upstream and downstream path and based on the oversubscription rate.

Once subscribers are provisioned and are online, the QOS profiles of each subscriber may be monitored and the traffic profile resulting from this monitoring may be sent to reverse bandwidth processor 165. The profiles may be monitored using an internet protocol data record (IPDR) collector software (version 2 available from the IPDR Organization) scheme that may provide protocol and packet size distribution. Also, the profiles may be monitored using IPDR collector software (version 1) that may provide traffic throughput and quality statistics. At first, the traffic profiling may be performed using external packet inspection gear, but external gear may not be QOS profile aware, and may only provide statistics on a per network element ID. This may lessen the granularity of the bandwidth optimization process because the process may not be aware how multiple QOS profiles may be performing for a particular network element.

From stage 410, where broadband switching system 110 creates the traffic signature, exemplary method 400 may advance to stage 420 where broadband switching system 110 may optimizing a quality of service for the network element based on the created traffic signature. For example, once reverse bandwidth processor 165 samples the traffic profile, broadband switching system 110 runs it through an algorithm and tweaks the QOS profiles to achieve an optimum performance for the services that are active within the sample traffic profile. This could include, but not limited to: i) giving the subscriber more bandwidth; ii) providing a profile that had less jitter and/or latency; and iii) tweaking other QOS parameters that can yield a performance gain at the subscriber while optimizing the bandwidth utilization at the network element ID level (e.g. the MAC layer.)

The optimized QOS profiles may be communicated to policy server 180 that may then set the policy on CMTS 185. Once the optimized QOS is established at CMTS 185, CMTS 185 may then send newly established QOS parameters to capacity management processor 155 that in turn may re-compute the capacity and create a new admission policy rule. After broadband switching system 110 optimizes the quality of service in stage 420, exemplary method 400 may then end at stage 430.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the stages of the disclosed methods may be modified in any manner, including by reordering stages and/or inserting or deleting stages, without departing from the principles of the invention.

It is intended, therefore, that the specification and examples be considered as exemplary only, with a true scope and spirit of the invention being indicated by the following claims and their full scope of equivalents.

What is claimed is:

1. A method for providing switched broadband, the method comprising:

creating a traffic signature corresponding to a network element connected to a network, the network element having a network element ID and being addressable on the network by the network element ID, the traffic signature indicating how multiple quality of service profiles that are active on the network element are performing on the network element, the multiple quality of service profiles respectively corresponding to a plurality of end-use devices connected to and being active on the network element wherein creating the traffic signature further comprises creating the traffic signature comprising a profile, at a network element level, of packet size and protocol distribution on a service class name level at a service flow level in data-over-cable service interface specification (DOCSIS); and optimizing a quality of service for the network element based on the created traffic signature, wherein optimizing the quality of service for the network element comprises adjusting the multiple quality of service profiles to optimize services corresponding to the multiple quality of service profiles active on the network element to optimize bandwidth utilization at the network element level wherein adjusting the multiple quality of service profiles comprises giving the network element more bandwidth, providing at least one of the multiple quality of service profiles with less jitter and latency, and tweaking other quality of service parameters that yield a performance gain at the network element while optimizing the bandwidth utilization at the network element level.

2. The method of claim 1, wherein creating the traffic signature further comprises creating the traffic signature comprising a profile including at least two separate profiles, one corresponding to a first service flow level and another corresponding to a second service flow level.

3. The method of claim 1, wherein creating the traffic signature corresponding to the network element further comprises creating the traffic signature corresponding to the network element comprising one of the following: a cable modem, a router, a computer, a personal digital assistant, a telephone, and a communications device.

4. The method of claim 1, wherein creating the traffic signature corresponding to the network element connected to the network, the network element having the network element ID, further comprises creating the traffic signature corresponding to the network element connected to the network, the network element having the network element ID comprising one of: a message authentication code (MAC) address, an internet protocol (IP) address, and a serial number.

5. The method of claim 1, wherein optimizing the quality of service further comprises optimizing the quality of service by dynamically reallocating bandwidth on the network.

6. A system for providing switched broadband, the system comprising:

a memory storage for maintaining a database; and a processing unit coupled to the memory storage, wherein the processing unit is operative to:

create a traffic signature corresponding to a network element connected to a network, the network element having a network element ID and being addressable on the network by the network element ID, the traffic signature configured to indicate how multiple quality of service profiles that are active on the network element are performing on the network element, the traffic signature comprising a profile, at a network element level, of packet size and protocol distribution on a service class name level at a service flow level in data-over-cable service interface specification (DOCSIS); and optimize a quality of service for the network element based on the created traffic signature, wherein the processing unit being operative to optimize the quality of service for the network element comprises processing unit being operative to adjust the multiple quality of service profiles to optimize services corresponding to the multiple quality of service profiles active on the network element to optimize bandwidth utilization at the network element level wherein the processing unit being operative to adjust the multiple quality of service profiles comprises the processing unit being operative to give the network element more bandwidth, provide at least one of the multiple quality of service profiles with less jitter and latency, and tweak other quality of service parameters that yield a performance gain at the network element while optimizing the bandwidth utilization at the network element level.

7. The system of claim 6, wherein the processing unit being operative to create the traffic signature further comprises the processing unit being operative to create the traffic signature comprising a profile including at least two separate profiles, one corresponding to a first service flow level and another corresponding to a second service flow level.

8. The system of claim 6, wherein the processing unit being operative to create the traffic signature corresponding to the network element further comprises the processing unit being operative to create the traffic signature corresponding to the network element comprising one of the following: a cable modem, a router, a computer, a personal digital assistant, a telephone, and a communications device.

9. The system of claim 6, wherein the processing unit being operative to create the traffic signature corresponding to the network element connected to the network, the network element having the network element ID, further comprises the processing unit being operative to create the traffic signature corresponding to the network element connected to the network, the network element having the network element ID comprising one of: a message authentication code (MAC) address, an internet protocol (IP) address, and a serial number.

10. The system of claim 6, wherein the processing unit being operative to optimize the quality of service further comprises the processing unit being operative to optimize the quality of service by dynamically reallocate bandwidth on the network.

11. A non-transitory computer-readable storage medium which stores a set of instructions which when executed performs a computer-readable medium for providing switched broadband, the computer-readable medium executed by the set of instructions comprising:

creating a traffic signature corresponding to a network element connected to a network, the network element having a network element ID and being addressable on the network by the network element ID, the traffic signature indicating how multiple quality of service profiles that are active on the network element are performing on the network element wherein creating the traffic signature further comprises creating the traffic signature comprising a profile, at a network element level, of protocol distribution and packet size on a service class name level at a service flow level in data-over-cable service interface specification (DOCSIS); and optimizing a quality of service for the network element based on the created traffic signature, wherein optimizing the quality of service for the network element comprises adjusting the multiple quality of service profiles to optimize services corresponding to the multiple quality of service profiles active on the network element to optimize bandwidth utilization at the network element level wherein adjusting the multiple quality of service profiles comprises giving the network element more bandwidth, providing at least one of the multiple quality of service profiles with less jitter and latency, and tweaking other quality of service parameters that yield a performance gain at the network element while optimizing the bandwidth utilization at the network element level.

12. The non-transitory computer-readable storage medium of claim 11, wherein creating the traffic signature further comprises creating the traffic signature comprising the profile, at the network element level, of packet size.

13. The non-transitory computer-readable storage medium of claim 11, wherein creating the traffic signature further comprises creating the traffic signature comprising a profile including at least two separate profiles, one corresponding to a first service flow level and another corresponding to a second service flow level.

14. The non-transitory computer-readable storage medium of claim 11, wherein creating the traffic signature corresponding to the network element further comprises creating the traffic signature corresponding to the network element comprising one of the following: a cable modem, a router, a computer, a personal digital assistant, a telephone, and a communications device.

15. The non-transitory computer-readable storage medium of claim 11, wherein creating the traffic signature corresponding to the network element connected to the network, the network element having the network element ID, further comprises creating the traffic signature corresponding to the network element connected to the network, the network element having the network element ID comprising one of: a message authentication code (MAC) address, an internet protocol (IP) address, and a serial number.

16. The non-transitory computer-readable storage medium of claim 11, wherein optimizing the quality of service further comprises optimizing the quality of service by dynamically reallocate bandwidth on the network.

17. The method of claim 1, wherein creating the traffic signature further comprises creating the traffic signature comprising a profile including at least two separate profiles, one corresponding to a first DOCSIS service flow level and another corresponding to a second DOCSIS service flow level.

* * * * *